2 Sheets. Sheet. 1.

HENRY BUSHNELL'S
IMPROVED
TIDAL WHEEL.

112,219. PATENTED FEB 28 1871

WITNESSES,
A. J. Cushing
Peter F. Hughes

INVENTOR,
Henry Bushnell

Sheet 2.

HENRY BUSHNELL'S
IMPROVED
TIDAL WHEEL.

WITNESSES:
A. J. Cushing
P. F. Hughes

INVENTOR:
Henry Bushnell

HENRY BUSHNELL, OF NEW HAVEN, CONNECTICUT.

Letters Patent No. 112,219, dated February 28, 1871.

IMPROVEMENT IN WATER-WHEELS.

The Schedule referred to in these Letters Patent and making part of the same.

*To all whom it may concern:*

Be it known that I, HENRY BUSHNELL, of New Haven, in the county of New Haven and State of Connecticut, have invented a new and useful Improvement in Tidal Wheels; and I do hereby declare that the following specification, taken in connection with the drawing making a part of the same, is a full, clear, and exact description thereof.

Wheels for the purpose of utilizing the power of a tidal current have for a long period been known and used; but, from the fact that the current runs at stated intervals in alternately opposite directions, it has been the universal rule, so far as I know, to make use of wheels for this purpose constructed with simple radial floats, so as to develop the same power with equal advantage whichever way the current runs. The difficulties incident to the conditions under which this class of wheels must work have, until my invention, prevented the application to them of the various forms of curved floats or improved buckets which have increased the effective power of wheels employed on running streams.

My invention is embodied in a wheel which is provided with curved floats of any preferred form, constituting, either alone or with other members of the wheel, a series of buckets, which floats can be reversed in position, so as to always present the mouths of the buckets against the tidal current.

A further improvement consists in a means for causing the curved floats or buckets to automatically shift their position after the tide has turned, so as to accommodate the wheel to the change in the direction of the current.

I prefer to locate the tidal wheel, hereinafter described, between the two hulls A A of a double boat, whose immersion should be such as to give at all times the proper dip to the floats of the wheel.

Figure 1:
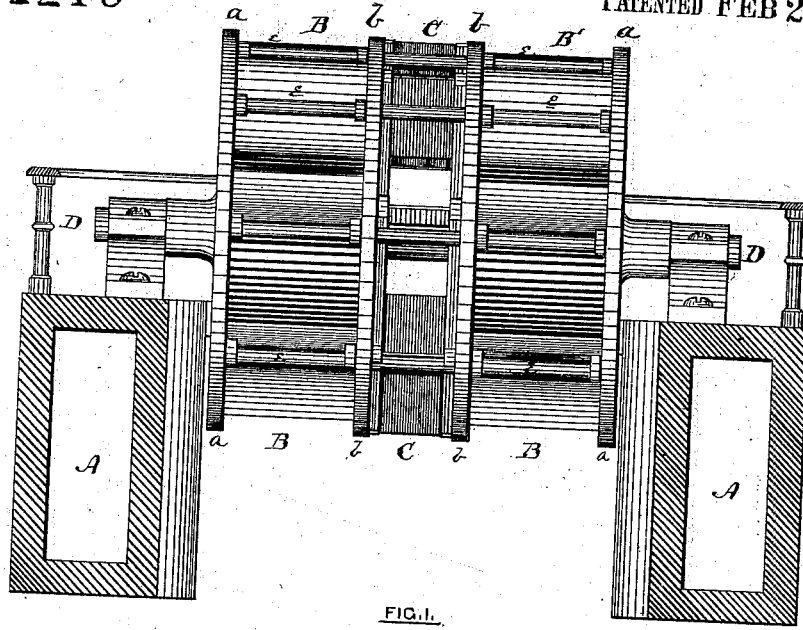
Figure 1 is a front elevation of the wheel, the boat upon which it is mounted being shown in section.
Figure 2:
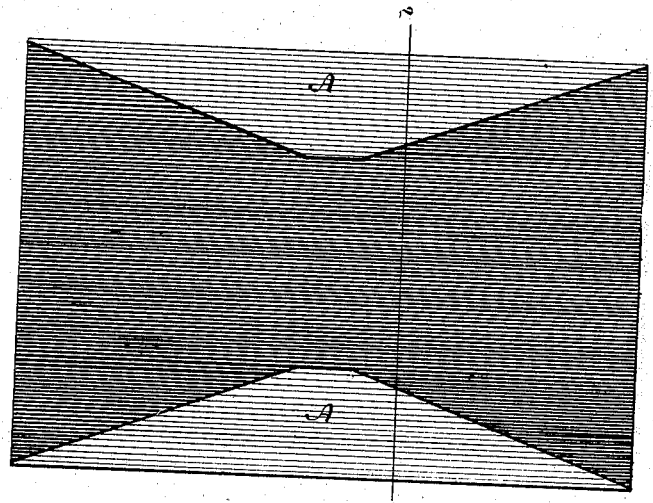
Figure 2 is a longitudinal horizontal section of the boat, or of a tide race-way in which the wheel is placed.

The sides of the hulls opposite each other should be so shaped below the water-line as to form a double flaring-mouthed race-way for the current, as seen at figs. 1 and 2, and the wheel should be placed in the narrowest part, so as to work under the same conditions whichever way the tide is running.

In the example shown in the drawing the wheel is made in three sections, B C B'.

Figure 3:
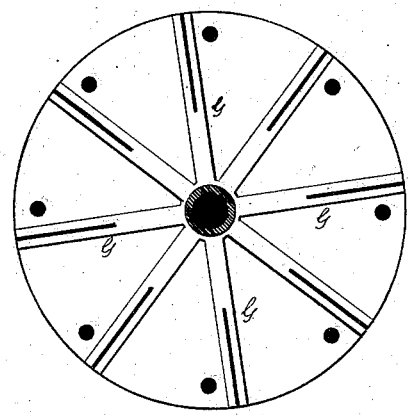
Figures 3 and 5 are sections through that portion of the wheel which is provided with radial floats.
Figure 5:
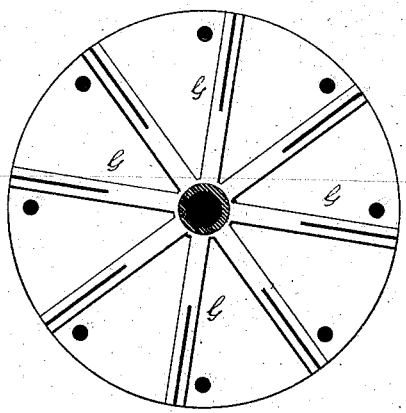

The central section C is occupied with a common radial float-wheel, set so as to turn on the shaft D, sectional views of the same being shown at figs. 3 and 5.

Figure 4:
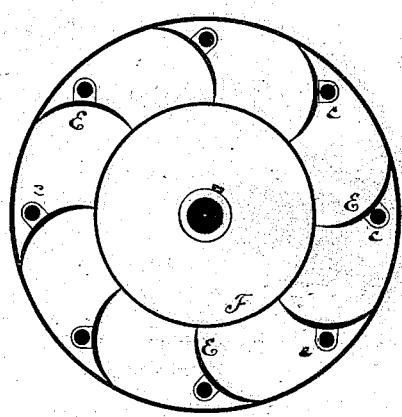
Figures 4 and 6 are sections through that portion of the wheel which is provided with reversible curved floats.
Figure 6:
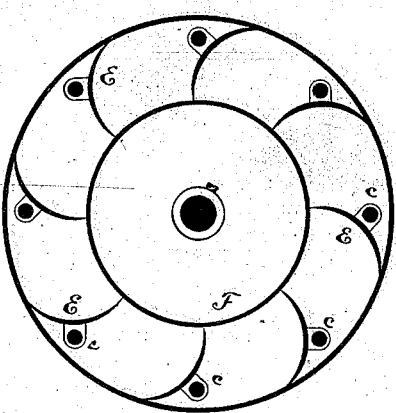

The outer sections B B' are, respectively, furnished with a series of curved floats, E, of the form best adapted to an under-shot wheel, shown in section at figs. 4 and 6.

The heads $a$ $a$ and the partitions $b$ $b$ of the wheel are all keyed to the shaft D, and each outer section B B' of the wheel is constructed with a drum, F, figs. 4 and 6, concentric with the shaft, the purpose of such drums being to form, in combination with the curved floats E, a series of buckets for each section.

Ear-pieces or lugs $c$ project from the convex back of each of the curved floats, and located midway between the ends thereof, through which is a hole, so as to enable the floats to be mounted on and keyed to rocker-shafts $e$, fig. 1, extending across the sections B B', respectively, as seen at fig. 1.

It is obvious that when the floats E stand as shown in section at fig. 4, they will, in combination with the central drums F, form curved buckets, with mouths open against a tidal current supposed to be running in a direction from right to left; and, furthermore, that if such floats are reversed in position, as shown in section at fig. 6, the buckets will be equally favorably situated to receive the force of the current running in the opposite direction.

For the purpose of shifting the floats simultaneously I employ any suitable mechanical means, as, for example, a lever movement, and prefer, for the greater perfection of the wheel, that a change in the tide should effect the reversal of the curved floats by furnishing the power to work the levers controlling such floats, although the necessary change can be readily effected by hand, and the wheel be thereby simplified in construction.

Figure 7:
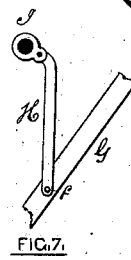
Figure 7 shows a detached view of the lever arrangement for reversing the curved float.

My arrangement for automatically shifting the curved floats is as follows:

G, fig. 7, represents one of the radial arms of the central radial float-wheel C.

The walls of the partition $b$ $b$, fig. 1, are hollow, and a pin, $f$, fig. 7, projects from the side of each of the radial arms G into the hollow space between the walls, curved slots being cut in the inner wall for the purpose.

By these pins $f$ levers H are pivoted, as shown at fig. 7, at one end, and at the other end are connected with short arms I, which are keyed to the ends of the shaft $e$.

Such arms I and levers H being within the hollow walls of the partitions $b$ $b$, suppose, now, that, in the position of the radial arms G of the wheel C and the short arms I, shown at fig. 7, the curved floats of the wheels B B' will stand as seen at fig. 6, it is apparent, upon the radial arms G being moved toward the left, or toward a perpendicular, the effect will be to rock the shafts e, fig. 1, to which the levers H are connected by means of the short arms or levers I, and reverse the curved floats to the position shown at fig. 4, and *vice versa*.

From the foregoing it will be understood that the current, while running in either direction, acts upon the floats of the three sections of the wheel without the wheel being affected by the capacity of its sets of curved floats or buckets to be reversed, but that, when the current has turned and commenced to run in the opposite direction, it will act in the first instance to turn the radial float-wheel C upon the shaft D, less power being required to do this than to overcome the inertia of the machinery with which the wheel is connected.

The turning of the wheel C upon its shaft, as before explained, causes the curved floats to be reversed, so as to present the mouths of the buckets against the current, which being effected, the wheel C can turn no further upon its shaft, and all these sections of the wheel turn with the shaft D as one wheel.

I wish it understood that I do not limit myself to the precise construction of a curved reversible float-wheel as described, nor to the specific arrangement or construction of the devices by which such curved floats are made reversible; but I mean to include all mere formal variations of form, structure, and arrangement accomplishing the same mode of operation by equivalent means.

I claim—

1. A tidal wheel with reversible curved floats or buckets, substantially as described, for the purposes specified.

2. A radial float-wheel, C, fitted to turn for a limited distance on its shaft D, in combination with one or more reversible curved float-wheels, B B', and a lever mechanism, G H I, whereby the curved floats or buckets will be automatically reversed upon the changing of the direction of the current, as described.

Witnesses:     HENRY BUSHNELL.
  PETER F. HUGHES,
  A. J. CUSHING.